(12) United States Patent
Ido

(10) Patent No.: US 9,118,608 B2
(45) Date of Patent: Aug. 25, 2015

(54) COMMUNICATION APPARATUS, CONTROL METHOD THEREFOR, AND COMPUTER-READABLE STORAGE MEDIUM

(71) Applicant: CANON KABUSHIKI KAISHA, Tokyo (JP)

(72) Inventor: Tetsuo Ido, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 77 days.

(21) Appl. No.: 14/150,146

(22) Filed: Jan. 8, 2014

(65) Prior Publication Data

US 2014/0226665 A1    Aug. 14, 2014

(30) Foreign Application Priority Data

Feb. 8, 2013 (JP) .................................. 2013-023824

(51) Int. Cl.
| | |
|---|---|
| *H04L 12/28* | (2006.01) |
| *H04L 12/741* | (2013.01) |
| *H04L 12/751* | (2013.01) |
| *H04L 29/12* | (2006.01) |

(52) U.S. Cl.
CPC .............. *H04L 45/745* (2013.01); *H04L 45/02* (2013.01); *H04L 45/54* (2013.01); *H04L 61/103* (2013.01); *H04L 61/6009* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 2004/0158640 A1* | 8/2004 | Philbrick et al. .............. | 709/230 |
| 2005/0265354 A1* | 12/2005 | Ryu ......................... | 370/395.52 |
| 2007/0140264 A1* | 6/2007 | Chen et al. ............... | 370/395.54 |
| 2008/0008183 A1* | 1/2008 | Takagaki et al. .............. | 370/392 |

FOREIGN PATENT DOCUMENTS

JP           4888369 B        2/2012

* cited by examiner

*Primary Examiner* — Duc C Ho
(74) *Attorney, Agent, or Firm* — Carter, DeLuca, Farrell & Schmidt, LLP

(57) ABSTRACT

In connection establishment processing in TCP communication, a next transmission destination IP address is decided by referring to a routing table. A next transmission destination MAC address associated with the next transmission destination IP address is decided by referring to the ARP table. The transmission destination IP address and the next transmission destination MAC address are stored as the connection management information in a connection management table. A transmission packet is created using the transmission destination IP address and the next transmission destination MAC address which are managed by the connection management information stored in the connection management table.

9 Claims, 8 Drawing Sheets

| TYPE | IP ADDRESS |
|---|---|
| DEFAULT GATEWAY | 192.168.1.1 |
| LOCAL NETWORK GROUP | 192.168.1.x |
|  |  |
|  |  |

| IP ADDRESS | MAC ADDRESS |
|---|---|
| 192.168.1.1 | bb:bb:bb:bb:bb:bb |
|  |  |
|  |  |
|  |  |

| IP ADDRESS | MAC ADDRESS |
|---|---|
| 192.168.1.11 | bb:bb:bb:bb:bb:bb |
| | |
| | |
| | |

| IP ADDRESS | MAC ADDRESS |
|---|---|
| 192.168.1.11 | cc:cc:cc:cc:cc:cc |
| | |
| | |
| | |

| IP ADDRESS | MAC ADDRESS |
|---|---|
| 192.168.1.1 | cc:cc:cc:cc:cc:11 |
|  |  |
|  |  |
|  |  |

| TYPE | IP ADDRESS |
|---|---|
| DEFAULT GATEWAY | 192.168.1.1 |
| LOCAL NETWORK GROUP | 192.168.1.x |
| | |
| | |

| TYPE | IP ADDRESS |
|---|---|
| DEFAULT GATEWAY | 192.168.1.1 |
| LOCAL NETWORK GROUP | 192.168.1.x |
| | |
| | |

| IP ADDRESS | MAC ADDRESS |
|---|---|
| 192.168.1.1 | cc:cc:cc:cc:cc:11 |
| 192.168.1.2 | dd:dd:dd:dd:dd:11 |
| | |
| | |

COMMUNICATION APPARATUS, CONTROL METHOD THEREFOR, AND COMPUTER-READABLE STORAGE MEDIUM

BACKGROUND OF THE INVENTION

1. Field of the Invention

The present invention relates to a communication technique of communicating with a terminal as a packet transmission destination via a network.

2. Description of the Related Art

Examples of a protocol commonly used in the Internet are a TCP and an IP. The IP corresponds to the network layer in the OSI reference model, and the TCP corresponds to the transport layer in the OSI reference model.

To implement TCP communication processing, it is a common practice to use a Transmission Control Block (TCB) which stores various kinds of information concerning control of TCP communication. The TCB is a management part for each TCP connection, which is implemented in a structure by software implementation. The TCB stores information such as a transition state, sequence number, ACK number, and window size necessary for TCP communication. TCP transmission/reception processing is attained by referring to or updating the information stored in the TCB.

In fact, when communicating with a partner terminal on a network using the TCP, a protocol in a lower layer is needed in addition to the TCP, and communication is performed using these protocols. As a practical example, a TCP segment as a TCP communication unit is formed into an IP packet, and the IP packet is encapsulated in an Ethernet frame, thereby accessing the network using an Ethernet®. Note that it is possible to identify the partner terminal on the network by a MAC address. Designating the MAC address of the partner terminal as the destination MAC address of the transmitted Ethernet frame enables the partner terminal to receive the Ethernet frame. The partner terminal can extract the IP packet from the received Ethernet frame, and then extract the TCP segment from the IP packet. This allows TCP communication.

Similarly, it is also possible to use a wireless LAN instead of the Ethernet.

As described above, by designating the MAC address of the partner terminal as the destination MAC address of the Ethernet frame, it is possible to correctly communicate the Ethernet frame to the partner terminal on the network. That is, the transmission source needs to know the MAC address of the partner terminal. A method of realizing such communication is to use an ARP and an ARP table.

The ARP table is created, updated, and deleted by the Address Resolution Protocol (ARP). In some cases, the user manipulates the ARP table. More specifically, the ARP table is formed by a set of information entries each of which is stored as a pair of the MAC address and IP address of a terminal on the network. Every time an IP packet is transmitted, the ARP table is searched for a corresponding MAC address based on the destination IP address of the IP packet. With this processing, a destination MAC address is decided, and a partner terminal on the network is identified, thereby allowing communication.

However, deciding a destination MAC address using the ARP table every time an IP packet is transmitted imposes a high processing load. More specifically, the ARP table is searched for an information entry corresponding to the destination IP address. If the target information entry is found, a destination MAC address is decided based on the found information entry, thereby creating the header of an Ethernet frame. That is, assume that a plurality of terminals exist on the network. In this case, as the number of terminals increases, the number of information entries managed by the ARP table also increases, resulting in a heavy processing load of searching for an information entry every time an IP packet is transmitted.

To solve this problem, there is proposed a method which uses a hash technique to increase the speed of search processing (Japanese Patent No. 4888369). Using this method for processing of searching the ARP table for an information entry can reduce the load of the search processing.

However, recent Ethernet standards allow communication at higher speed. Similarly, the speed of communication has increased in wireless LANs. To perform communication in such high-speed network, it is desired to further increase the speed of search processing in reference of the ARP table.

SUMMARY OF THE INVENTION

The present invention reduces the load of table reference processing, and provides higher-speed TCP/IP communication.

To achieve the above object, a communication apparatus according to the present invention has the following arrangement. That is, a communication apparatus which communicates with a terminal as a packet transmission destination via a network, comprises: a routing table configured to hold a next transmission destination IP address as route information; an ARP table configured to manage an IP address and a MAC address of the terminal on the network in association with each other; a connection management table configured to hold connection management information as information added to each connection in TCP communication; a route decision unit configured to decide a next transmission destination IP address by referring to the routing table in connection establishment processing in TCP communication; a MAC address decision unit configured to decide a next transmission destination MAC address associated with the next transmission destination IP address by referring to the ARP table; a storage unit configured to store the transmission destination IP address and the next transmission destination MAC address as the connection management information in the connection management table; and a creation unit configured to create a transmission packet using the transmission destination IP address and the next transmission destination MAC address which are managed by the connection management information stored in the connection management table.

According to the present invention, it is not necessary to access a main storage storing the ARP table in processing upon TCP transmission, and to perform search processing of searching the ARP table for a target entry, thereby reducing the processing load and realizing higher-speed TCP communication.

Further features of the present invention will become apparent from the following description of exemplary embodiments (with reference to the attached drawings).

DESCRIPTION OF THE EMBODIMENTS

Embodiments of the present invention will be described in detail below with reference to the accompanying drawings.

<First Embodiment>

Processing when a communication terminal (communication apparatus) performs TCP transmission to a network using an Ethernet® will be explained.

Figure 1:
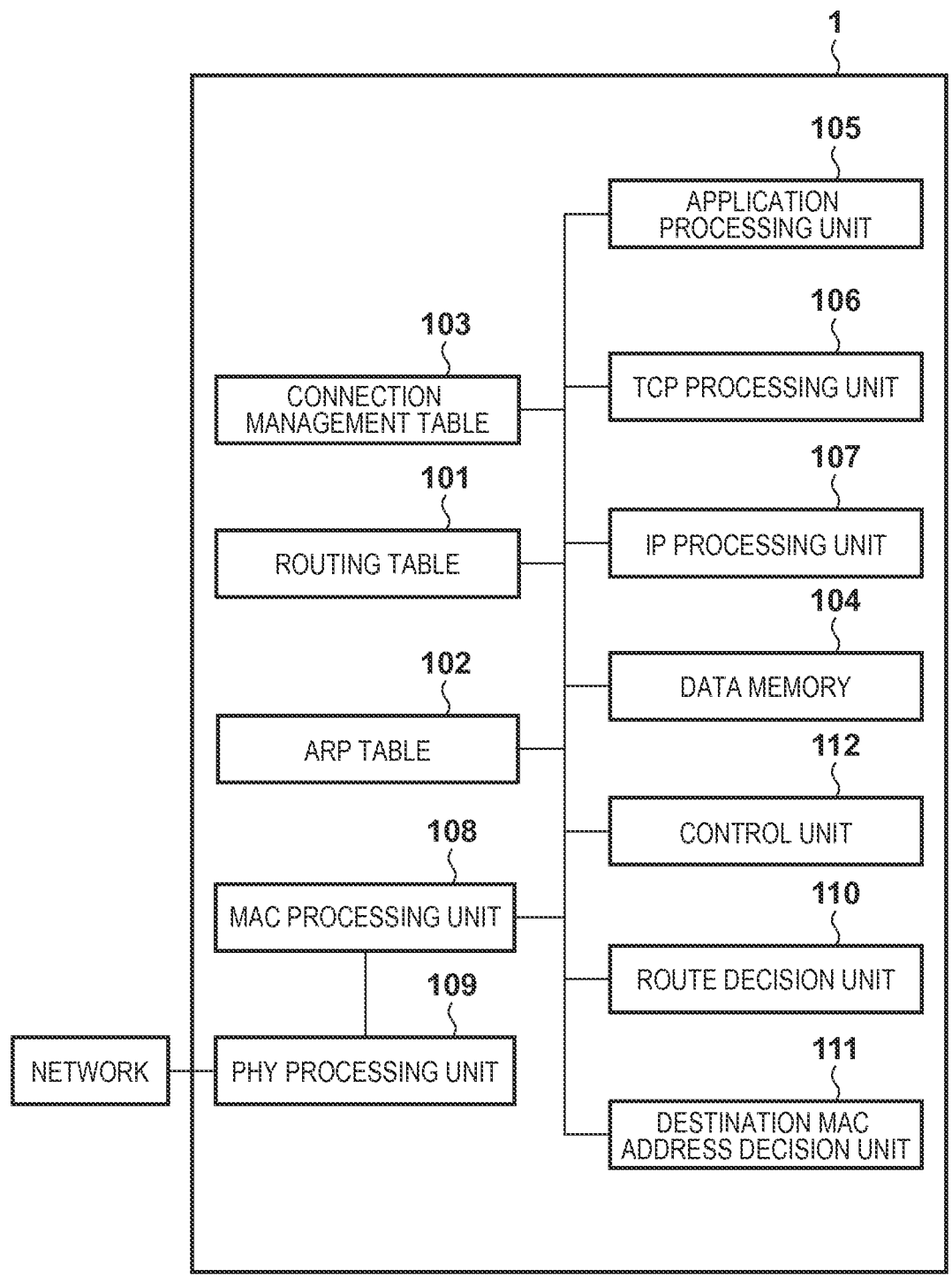
FIG. 1 is a block diagram showing the functional arrangement of a communication terminal according to the first embodiment.

FIG. 1 is a block diagram showing the functional arrangement of the communication terminal.

A routing table 101 holds a next transmission destination IP address as route information. An ARP table 102 manages the IP address and MAC address of a communication terminal on a network in association with each other. A connection management table 103 holds connection management information as information added to each connection in TCP communication. An example of the connection management information is a TCB.

A data memory 104 stores data such as image data processed by a user or application. An application processing unit 105 executes an application, refers to the data recorded in the data memory 104, and sends the data to a TCP processing unit 106. The application processing unit 105 receives data from the TCP processing unit 106, and records the data in the data memory 104.

The TCP processing unit 106 performs TCP protocol processing using the connection management table 103. An IP processing unit 107 performs IP protocol processing. A MAC processing unit 108 controls an Ethernet MAC device to perform MAC protocol processing. A PHY processing unit 109 controls an Ethernet PHY device to perform PHY protocol processing. Note that the PHY is a communication model which defines the most physical connection form in the OSI reference model representing the functions of protocols in a network, and indicates a physical layer positioned in the first one of seven layers in total.

A route decision unit 110 decides a next transmission destination IP address by referring to the routing table 101. A destination MAC address decision unit 111 decides a next transmission destination MAC address associated with the next transmission destination IP address by referring to the ARP table 102.

A control unit 112 controls the overall communication processing, and stores the destination IP address and the next transmission destination MAC address as a TCB in the connection management table 103. When the ARP table 102 is updated, the control unit 112 controls to update the connection management table 103. Furthermore, the control unit 112 creates a transmission packet using the TCB stored in the connection management table 103.

Figure 2:
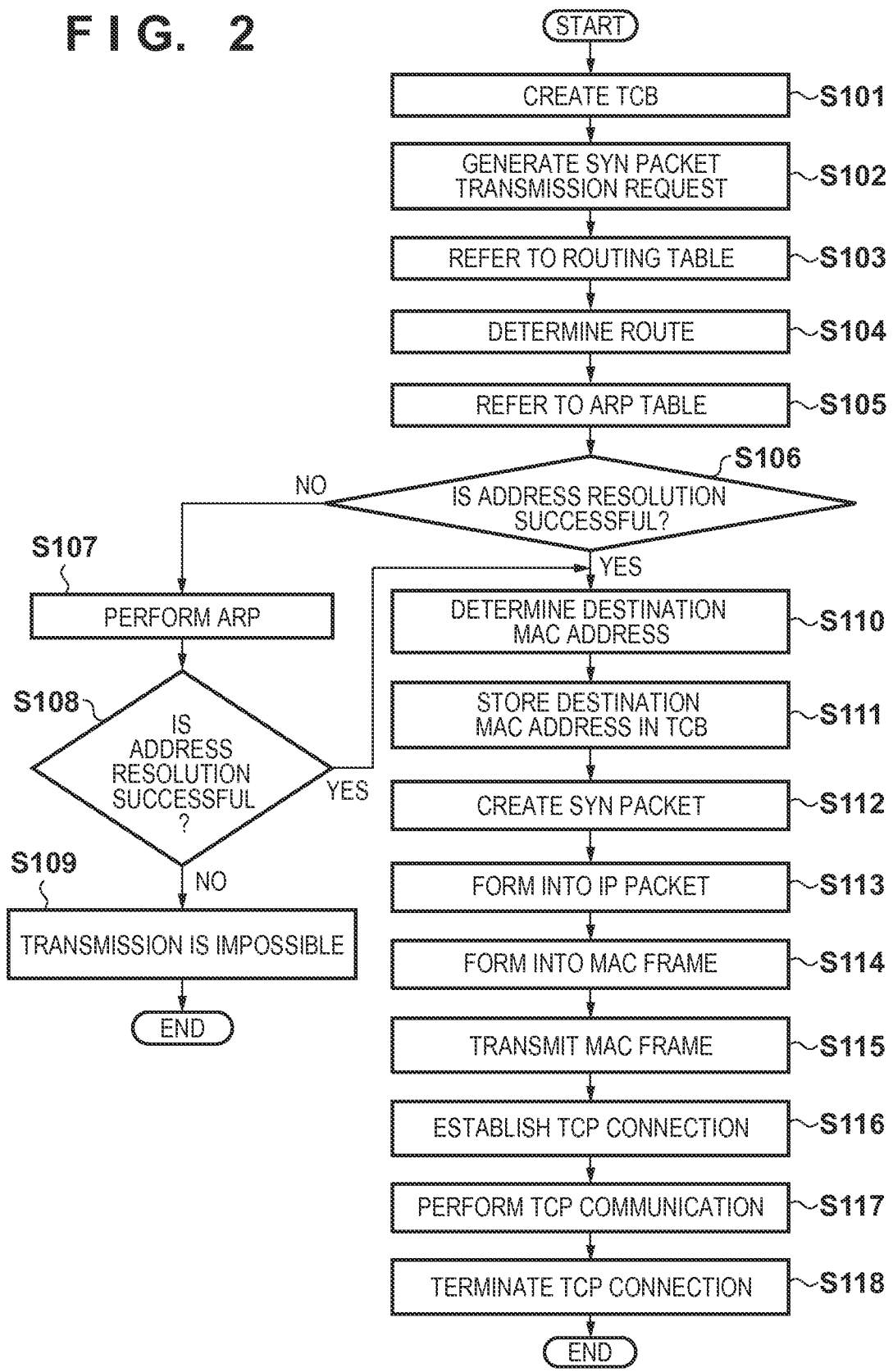
FIG. 2 is a flowchart illustrating processing according to the first embodiment.
Figures 3, 4, 5:
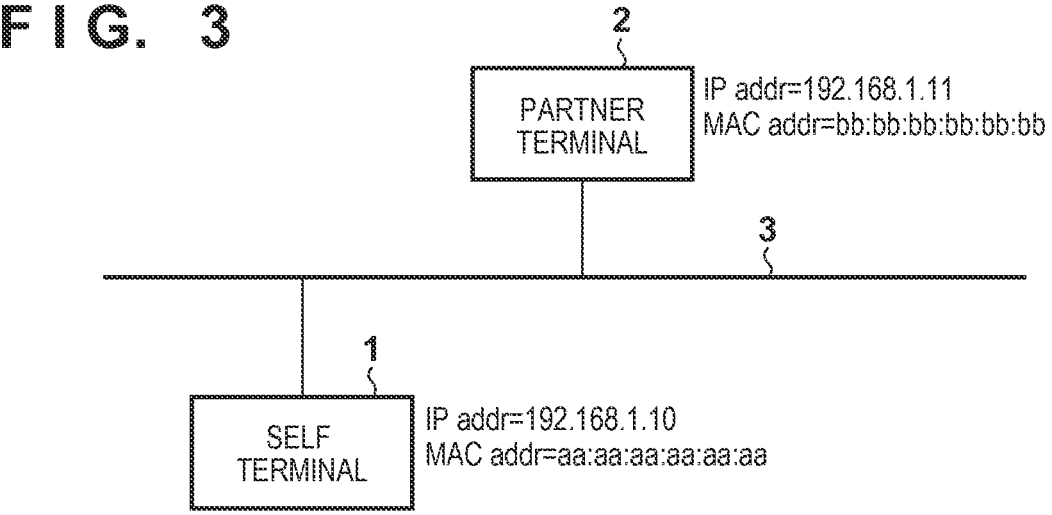
FIG. 3 is view showing a system configuration according to the first embodiment.
FIG. 4 is a table showing an example of a routing table according to the first embodiment.
FIG. 5 is a table showing an example of an ARP table according to the first embodiment.

A description will be provided below with reference to a flowchart shown in FIG. 2. FIG. 3 shows a system configuration. In the system configuration, a self terminal 1 serving as a communication terminal (FIG. 1) and a partner terminal 2 exist on a local network 3.

Assume that the IP address and MAC address of the self terminal 1 are 192.168.1.10 and aa:aa:aa:aa:aa:aa, respectively. Assume also that the IP address and MAC address of the partner terminal 2 are 192.168.1.11 and bb:bb:bb:bb:bb:bb, respectively.

First, in step S101, to establish a TCP connection between the self terminal 1 and the partner terminal 2, each of the self terminal 1 and the partner terminal 2 creates a TCB (connection management information) for managing a TCP connection for each connection in the connection management table 103. The self terminal 1 which requests to establish a connection holds the port number and IP address of the partner terminal 2 in the TCB. The partner terminal 2 which waits for establishment of a connection holds a receiving port number in the TCB.

In step S102, the self terminal 1 starts TCP SYN packet transmission processing to the partner terminal 2. First, the self terminal 1 generates a SYN packet transmission request.

As the SYN packet transmission processing, the self terminal 1 first refers to the routing table 101 in step S103. Assume that the routing table 101 at this time is as shown in FIG. 4.

Upon referring to the routing table 101, the IP address of the partner terminal 2 held in the TCB is 192.168.1.11. It is, therefore, determined that the partner terminal 2 belongs to the local network 3. Since the condition that the partner terminal 2 belongs to the local network 3 has priority over that of a default gateway, such determination is made. In step S104, therefore, the self terminal 1 determines as a route that a next transmission destination address is the IP address of the partner terminal 2.

In step S105, the self terminal 1 refers to the ARP table 102. In step S106, by referring to the ARP table 102, the self terminal 1 determines whether transmission destination address resolution has succeeded. If it is determined that the address resolution has succeeded (YES in step S106), the process advances to step S110. On the other hand, if the address resolution has failed (NO in step S106), the process advances to step S107.

A case in which the next transmission destination IP address 192.168.1.11 has not been found from the ARP table 102 (the address resolution is failed) will be explained. In this case, in step S107, the self terminal 1 transmits an ARP request packet for address resolution to the local network 3 (performs an ARP).

In step S108, by receiving an ARP response to the ARP request, the self terminal 1 determines whether address resolution has succeeded. If it is determined that the address resolution has succeeded (YES in step S108), the process advances to step S110. On the other hand, if the address resolution has failed (NO in step S108), the process advances to step S109.

When the communication terminal on the local network 3 receives the ARP request, it returns an ARP response. The ARP response contains the IP address and MAC address of the communication terminal which has responded. When the self terminal 1 receives the ARP response, it can identify the IP address and MAC address of the partner terminal 2, and newly add (update) the pair of the IP address and MAC address to the ARP table 102. FIG. 5 shows the ARP table 102 at this time.

By updating the ARP table 102, the self terminal 1 can refer to the ARP table 102 again to find the next transmission destination IP address 192.168.1.11 in the TCP layer. In step S110, the self terminal 1 determines the next transmission destination MAC address bb:bb:bb:bb:bb:bb (destination MAC address) corresponding to the next transmission destination IP address.

A case in which it is determined in step S108 that the address resolution has failed indicates a case in which update of the ARP table 102 has failed or a case in which the ARP table 102 has been updated but the next transmission destination IP address has not been found. In this case, in step S109, the self terminal 1 invalidates the next transmission destination MAC address stored in the TCB, and discards transmission processing when detecting invalidation upon creating a MAC header.

In step Sill, the self terminal 1 stores the next transmission destination MAC address (destination MAC address) in the TCB for this connection. In step S112, the self terminal 1 creates a SYN packet in the TCP layer. At this time, the receiving port number of the partner terminal 2 is set as the destination port number of the TCP header of the SYN packet. It is possible to identify the port number of the partner terminal 2 by referring to the TCB held for this connection.

In step S113, the self terminal 1 forms the SYN packet in the IP layer into an IP packet. The IP address of the partner terminal 2 is set as the destination IP address of the IP header. It is possible to identify the IP address of the partner terminal 2 by referring to the TCB held for this connection.

In step S114, the self terminal 1 encapsulates the IP packet in a MAC frame in the MAC layer. In this example, the self terminal 1 encapsulates the IP packet in, for example, an Ethernet frame. At this time, the next transmission destination MAC address is set as the destination MAC address of the Ethernet header. It is possible to identify the next transmission destination MAC address by referring to the TCB held for this connection.

With this processing, the self terminal 1 encapsulates the SYN packet in an Ethernet frame, and transmits the Ethernet frame to the local network 3 in step S115.

Note that the Ethernet is an example of the MAC layer, and a wireless LAN can be used instead of the Ethernet. If the wireless LAN is used, the MAC layer complies with the 802.11g standard, the 802.11n standard, or the like but similar processing is performed.

As TCP connection establishment processing, in step S116 the self terminal 1 completes the TCP connection establishment processing called three-way handshaking by transmitting an ACK to a SYN-ACK packet returned from the partner terminal 2.

Upon establishment of a TCP connection, in step S117 the self terminal 1 can encapsulate a packet in an Ethernet frame to execute TCP communication by referring to a TCB for the connection in subsequent data transmission or ACK transmission using a TCP. Upon completion of the TCP communication, the self terminal 1 terminates the TCP connection in step S118.

Figure 6:
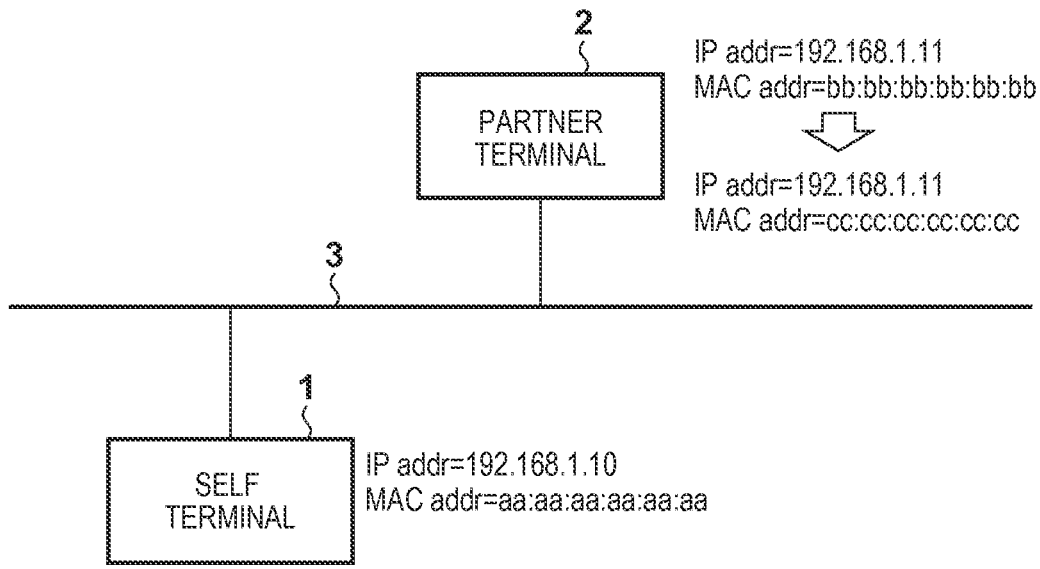
FIG. 6 is a view showing an example when the NIC of a partner terminal changes according to the first embodiment.

A case in which the NIC of the partner terminal 2 is switched will be described. Assume, for example, that a failure of the NIC occurs and the NIC is replaced, the NIC is replaced by an NIC having a higher performance, the Ethernet is switched to the wireless LAN, or the wireless LAN is switched to the Ethernet (see FIG. 6).

Figure 7:
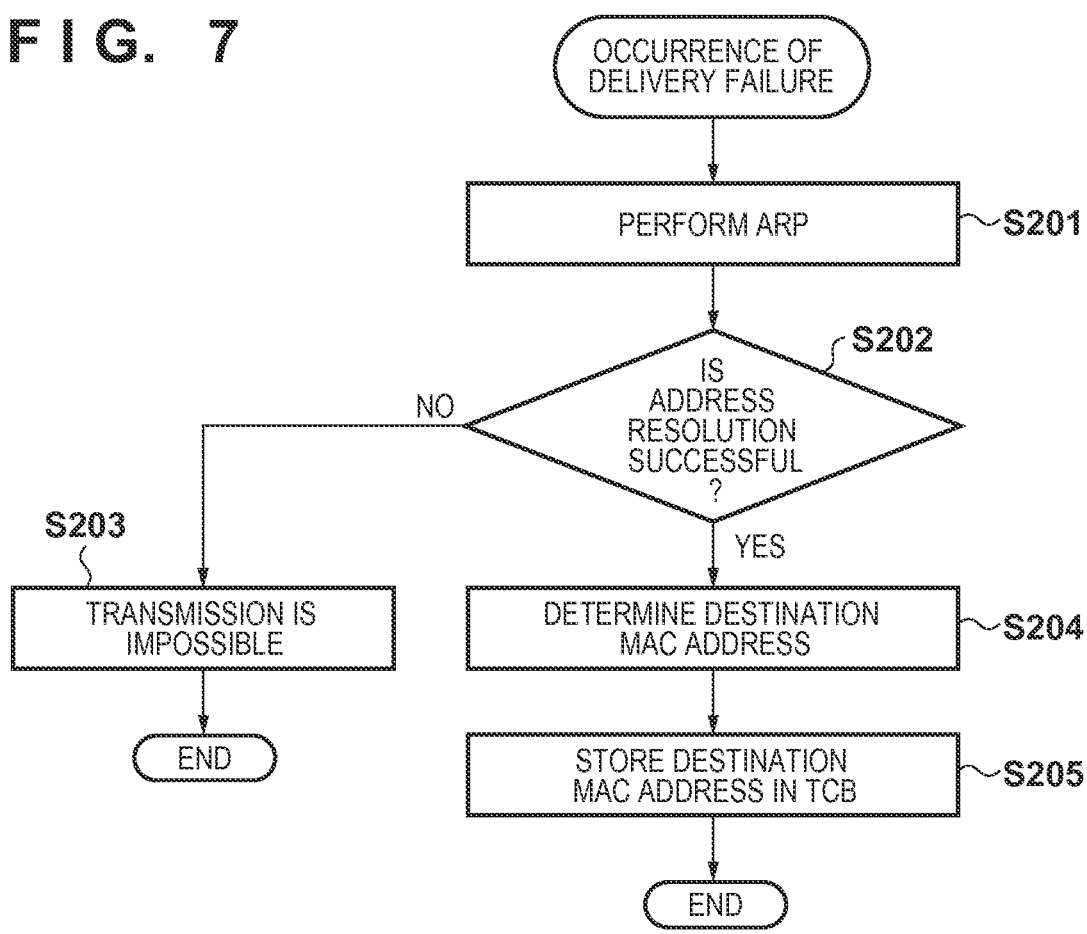
FIG. 7 is a flowchart when a packet delivery failure occurs according to the first embodiment.

A description will be provided with reference to a flowchart shown in FIG. 7.

In this case, the MAC address of the partner terminal changes. Even if, therefore, the TCP data is encapsulated in an Ethernet frame and transmitted, it cannot reach the destination (delivery failure). In such case, a "delivery failure" message is sent from the network to the destination or an unreachable state continues.

In this state, in step S201, the self terminal 1 transmits an ARP request packet to the local network 3 again (performs the ARP). In step S202, by receiving an ARP response to the ARP request, the self terminal 1 determines whether address resolution has succeeded. If it is determined that the address resolution has failed (NO in step S202), the process advances to step S203. In step S203, the self terminal 1 invalidates the next transmission destination MAC address held in the TCB, and discards transmission processing when detecting invalidation upon creating a MAC header.

Figure 8:
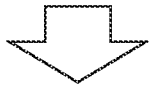
FIG. 8 is a view showing an example of update of the ARP table according to the first embodiment.

On the other hand, if the address resolution has succeeded (YES in step S202), the process advances to step S204. In step S204, by receiving the ARP response from the partner terminal 2, the self terminal 1 can identify the IP address and new MAC address (destination MAC address) of the partner terminal 2, and register (update) them in the ARP table 102. FIG. 8 shows the ARP table 102 at this time.

The self terminal 1 refers to the routing table 101 (FIG. 4) again, and reconfirms that the destination IP address 192.168.1.11 belongs to the local network 3, thereby determining the next transmission destination IP address. The self terminal 1 confirms whether the next transmission destination IP address 192.168.1.11 exists in the ARP table 102 (FIG. 8). Since the ARP table 102 has been updated, the self terminal 1 can find the next transmission destination IP address 192.168.1.11. This enables the self terminal 1 to determine a corresponding next transmission destination MAC address cc:cc:cc:cc:cc:cc (destination MAC address).

In step S205, the self terminal 1 stores the next transmission destination MAC address (destination MAC address) in the TCB for this connection.

When the ARP table 102 is updated, the self terminal 1 refers to the routing table 101 and the ARP table 102 for all the currently established connections in the same manner. If necessary, the self terminal 1 may update (set as an update target) the next transmission destination MAC address of each TCB.

Assume, for example, that after creating a transmission packet using the next transmission destination MAC address, the ARP table is updated. In this case, when the next transmission destination MAC address in the connection upon update is different from that managed by the connection management information stored in the connection management table, the connection management information stored in the connection management table may be updated by the next transmission destination AMC address.

Since the next transmission destination MAC address and the IP address of the partner terminal 2 are stored in the TCB, a destination IP address as part of the IP header and a destination MAC address as part of the MAC header may be set in the TCP layer.

If update of the ARP table 102 fails or if the ARP table 102 is updated but the next transmission destination IP address is not found, the next transmission destination MAC address stored in the TCB may be invalidated, and transmission processing may be discarded when detecting invalidation upon creating a MAC header.

With the above processing, it is possible to transmit an IP packet without executing processing of referring to the routing table 101 and the ARP table 102 every time an IP packet is transmitted.

As described above, according to the first embodiment, the next transmission destination MAC address and the IP address of the partner terminal are stored and managed in the TCB of the connection management table 103, and the TCB is used to create a transmission packet. With this processing, it becomes unnecessary to access the main storage storing the ARP table in processing upon TCP transmission. Furthermore, search processing of searching the ARP table for a target entry becomes unnecessary, thereby reducing the processing load and realizing higher-speed TCP communication.

<Second Embodiment>

In the second embodiment, processing when TCP transmission to a network is performed using a wireless LAN and roaming (changing of a wireless LAN gateway terminal) is performed in the middle of the TCP transmission will be explained.

The arrangement of a self terminal 1 is the same as the functional arrangement shown in FIG. 1 according to the first embodiment. Note that a MAC processing unit 108 and a PHY processing unit 109 are compatible with the wireless LAN.

Figure 9:
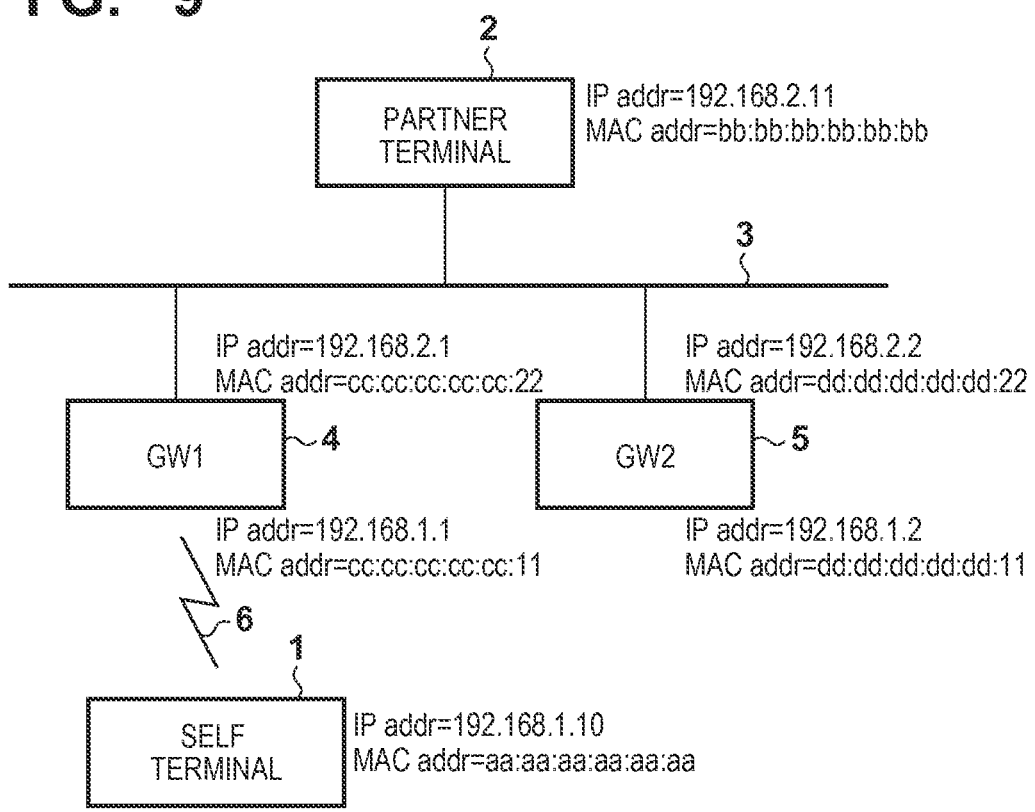
FIG. 9 is a view showing a system configuration according to the second embodiment.

A description will be provided below with reference to the flowchart shown in FIG. 2. FIG. 9 shows a system configuration. The self terminal 1 serving as a communication terminal and a wireless LAN gateway terminal 4 (to be referred to as a GW1 hereinafter) are connected to each other by a local network 6 (for example, a wireless LAN network), and the GW1 and a partner terminal 2 are connected to each other by a local network 3 (for example, an Ethernet). Similarly, the self terminal 1 and a wireless LAN gateway terminal 5 (to be referred to as a GW2 hereinafter) are connectable by the local network 6, and the GW2 and the partner terminal 2 are connected to each other by the local network 3. The local network 6 using the wireless LAN is different from the local network 3 using the Ethernet, and the GW1 and the GW2 serve as gateways, respectively. Furthermore, the GW1 is set as a default gateway terminal.

Assume that the IP address and MAC address of the self terminal 1 are 192.168.1.10 and aa:aa:aa:aa:aa:aa, respectively. The IP address and MAC address of the partner terminal 2 are 192.168.2.11 and bb:bb:bb:bb:bb:bb, respectively. Furthermore, the IP address and MAC address of the GW1 on the wireless LAN side are 192.168.1.1 and cc:cc:cc:cc:cc:11, respectively. The IP address and MAC address of the GW1 on the Ethernet side are 192.168.2.1 and cc:cc:cc:cc:cc:22, respectively. The IP address and the MAC address of the GW2 on the wireless LAN side are 192.168.1.2 and dd:dd:dd:dd:dd:11, respectively. Furthermore, the IP address and MAC address of the GW2 on the Ethernet side are 192.168.2.2 and dd:dd:dd:dd:dd:22.

First, in step S101, to establish a TCP connection between the self terminal 1 and the partner terminal 2, each of the self terminal 1 and the partner terminal 2 creates a TCB for managing a TCP connection for each connection in a connection management table 103. The self terminal 1 which requests to establish a connection holds the port number and IP address of the partner terminal 2 in the TCB. The partner terminal 2 which waits for establishment of a connection holds a receiving port number in the TCB.

In step S102, the self terminal 1 starts TCP SYN packet transmission processing to the partner terminal 2. First, the self terminal 1 generates a SYN packet transmission request.

As the SYN packet transmission processing, the self terminal 1 first refers to a routing table 101 in step S103. Assume that the routing table 101 at this time is as shown in FIG. 4.

By referring to the routing table 101, the IP address 192.168.2.11 of the partner terminal 2 held in the TCB does not belong to the local network 6 or any other networks. That is, in step S104, the self terminal 1 determines as a route that a next transmission destination IP address is the IP address 192.168.1.1 of the default gate way.

In step S105, the self terminal 1 refers to an ARP table 102 to determine the next transmission destination IP address. In step S106, by referring to the ARP table 102, the self terminal 1 determines whether transmission destination address resolution has succeeded. If it is determined that the address resolution has failed (NO in step S106), it is assumed that the next transmission destination IP address is resolved in steps S107 and S108, similarly to the first embodiment. In step S110, the self terminal 1 determines a next transmission destination MAC address associated with the next transmission destination IP address. Assume that the ARP table at this time is as shown in FIG. 10.

In step Sill, the self terminal 1 stores the next transmission destination MAC address in the TCB for this connection.

SYN packet transmission processing is performed in steps S112 to S115, as described in the first embodiment, and a SYN packet can be encapsulated in a MAC frame by referring to the TCB and transmitted to the local network 6. In step S116, the self terminal 1 completes TCP connection establishment processing. In step S117, the self terminal 1 can encapsulate a packet in a MAC frame by referring to the TCB for this connection in subsequent data transmission or ACK transmission using the TCP. Upon completion of communication, the self terminal 1 terminates the TCP connection in step S118.

Figures 10, 11:
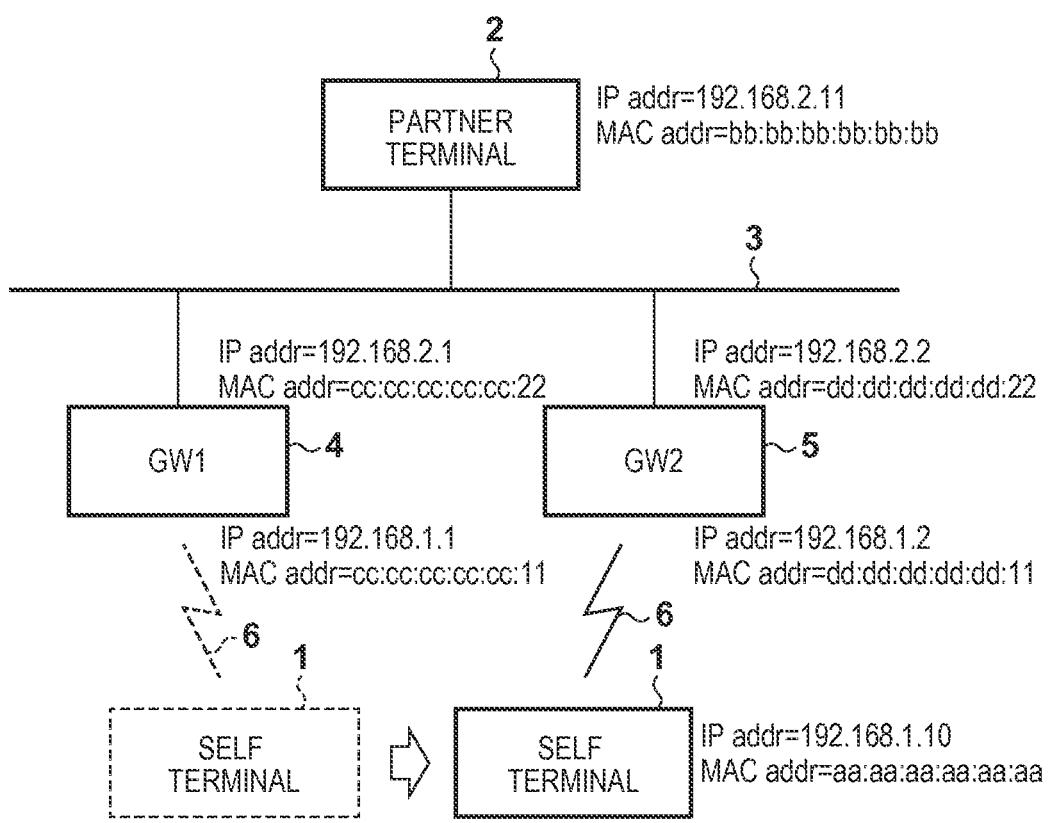
FIG. 10 is a table showing an example of an ARP table according to the second embodiment.
FIG. 11 is a view showing an example when a gateway changes according to the second embodiment.

A case in which the gateway changes, as shown in FIG. 11, will be described. For example, assume that the self terminal 1 moves to a different wireless communication area or replaces the GW during TCP communication processing.

Figure 12:
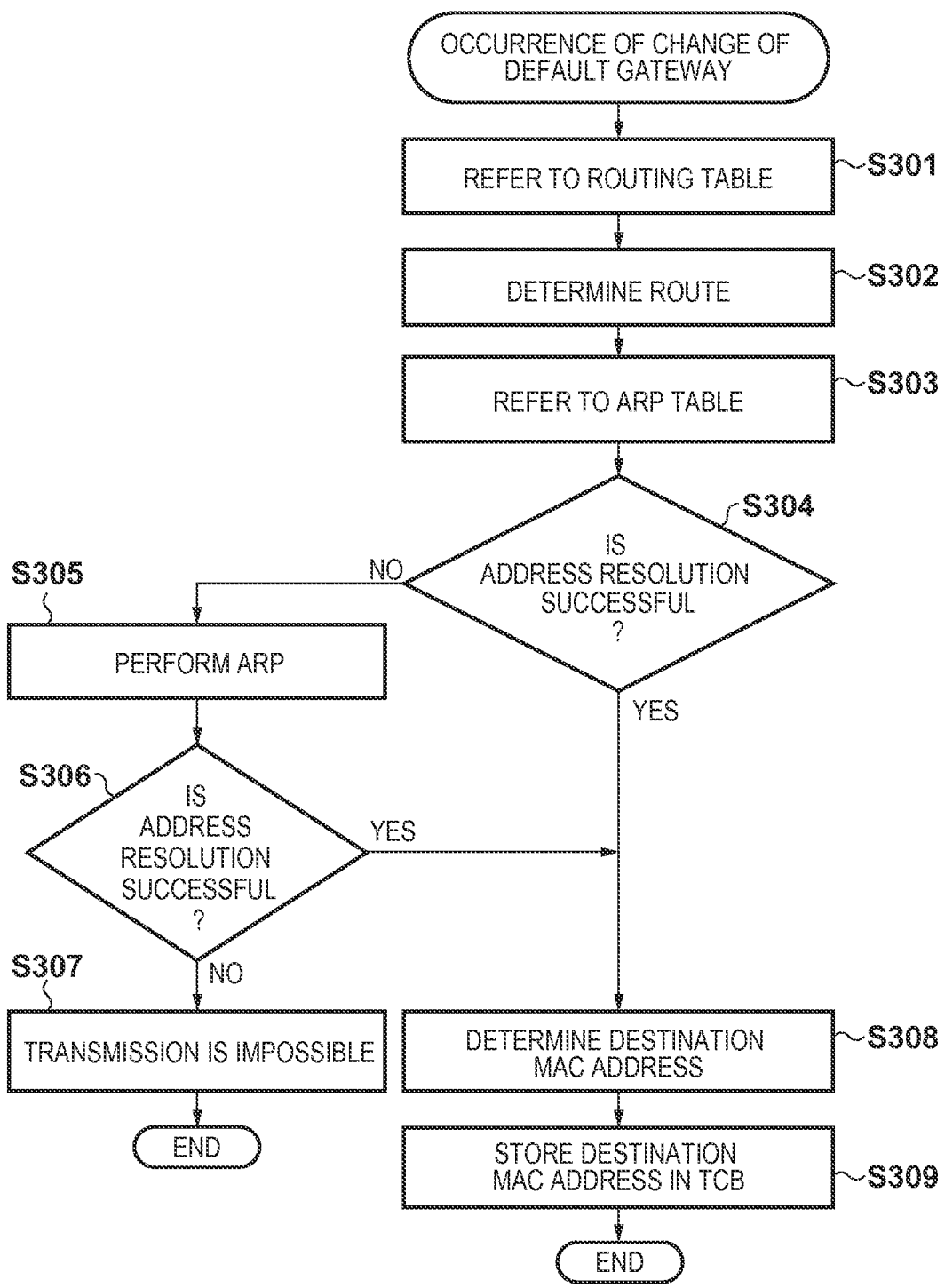
FIG. 12 is a flowchart illustrating processing when the gateway changes according to the second embodiment.

A description will be provided with reference to a flowchart shown in FIG. 12.

Figures 13, 14:
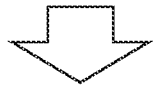
FIG. 13 is a view showing an example of changing of a routing table.
FIG. 14 is a table showing an example of the ARP table according to the second embodiment.

In such case, the default gateway changes and thus the next transmission destination MAC address also changes. In this case, default gateway information held in the routing table 101 of the self terminal 1 is updated by a setting change operation by the user, the function of a DHCP, or another method. FIG. 13 shows the routing table 101 at this time.

If the default gateway changes, the self terminal 1 refers to the routing table 101 (FIG. 13) in step S301. In step S302, the self terminal 1 determines as a route that the IP address of the default gateway is 192.168.1.2. In step S303, the self terminal 1 determines whether address resolution has succeeded based on whether the IP address 192.168.1.2 of the default gateway is registered in the ARP table 102. If it is determined that the IP address is registered in the ARP table 102 and the address resolution has failed (NO in step S304), the self terminal 1 transmits an ARP request packet (performs an ARP) in step S305.

In step S306, by receiving an ARP response to the ARP request, the self terminal 1 determines whether address resolution has succeeded. If it is determined that the address resolution has failed (NO in step S306), for example, if update of the ARP table 102 fails or if the ARP table 102 is updated but the next transmission destination IP address is not found, the process advances to step S307. In step S307, the self terminal 1 invalidates the next transmission destination MAC address held in the TCB, and discards transmission processing when detecting invalidation upon creating a MAC header.

On the other hand, if the address resolution has succeeded (YES in step S306), the self terminal 1 updates the ARP table 102. Note that the self terminal 1 may transmit an ARP request packet and update the ARP table 102 without performing determination. Assume that the ARP table 102 is updated by an ARP response from the GW2 (see FIG. 14). After that, in step S308, the next transmission destination MAC address is determined from the ARP table 102. In step S309, the self terminal 1 stores the next transmission destination MAC address dd:dd:dd:dd:dd:11 in the TCB for this connection, as described in the first embodiment.

With the above processing, it is possible to transmit an IP packet without executing processing of referring to the routing table 101 and the ARP table 102 every time an IP packet is transmitted.

As described above, according to the second embodiment, it is possible to achieve the same effects as those in the first embodiment even in a wireless LAN environment.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-023824, filed Feb. 8, 2013, which is hereby incorporated by reference herein in its entirety.

What is claimed is:

1. A communication apparatus which communicates with a terminal, which has a transmission destination IP address, as a packet transmission destination via a network, comprising:
    a routing table configured to hold a next transmission destination IP address as route information;
    an ARP table configured to manage an IP address and a MAC address of the terminal on the network in association with each other;
    a connection management table configured to hold connection management information as information added to each connection in TCP communication;
    a route decision unit configured to decide a next transmission destination IP address by referring to said routing table in connection establishment processing in TCP communication;
    a MAC address decision unit configured to decide a next transmission destination MAC address associated with the next transmission destination IP address by referring to said ARP table;
    a storage unit configured to store the transmission destination IP address and the next transmission destination MAC address as the connection management information in said connection management table; and
    a creation unit configured to create a transmission packet using the transmission destination IP address and the next transmission destination MAC address which are managed by the connection management information stored in said connection management table.

2. The apparatus according to claim 1, wherein
when said ARP table is updated, if a next transmission destination MAC address in a connection upon update is different from the next transmission destination MAC address managed by the connection management information stored in said connection management table, said storage unit updates the connection management information stored in said connection management table by the next transmission destination MAC address.

3. The apparatus according to claim 1, wherein
when it is detected that the transmission packet is unreachable to the transmission destination terminal, said route decision unit decides a next transmission destination IP address by referring to said routing table again, and
if a next transmission destination MAC address associated with the next transmission destination IP address decided by said route decision unit is not decided by referring to said ARP table, said MAC address decision unit transmits an ARP request to the network, and updates said ARP table based on an ARP response to the ARP request, which is received from the network.

4. The apparatus according to claim 1, wherein
when said routing table is updated during TCP communication processing, said route decision unit decides a next transmission destination IP address by referring to said routing table again,
said MAC address decision unit decides a next transmission destination MAC address associated with the next transmission destination IP address decided by said route decision unit by referring to said ARP table, and
said storage unit updates the connection management information stored in said connection management table by the next transmission destination MAC address decided by said MAC address decision unit.

5. The apparatus according to claim 1, wherein
when said routing table is updated, corresponding connection management information managed by said connection management table is referred to for all currently established TCP communication connections, and if an IP address managed by the connection management information is an update target of said routing table,
said route decision unit decides a next transmission destination IP address by referring to said routing table again,
said MAC address decision unit decides a next transmission destination MAC address associated with the next transmission destination IP address decided by said route decision unit by referring to said ARP table, and
said storage unit updates connection management information managed by said connection management table by the next transmission destination MAC address decided by said MAC address decision unit.

6. The apparatus according to claim 1, wherein
if the next transmission destination MAC address is not decided by referring to said ARP table, said MAC address decision unit transmits an ARP request to the network, and updates said ARP table based on an ARP response to the ARP request, which is received from the network, and if a next transmission destination MAC address in a connection is not decided by the update, said storage unit invalidates a next transmission destination MAC address managed by the connection management information stored in said connection management table.

7. The apparatus according to claim 1, wherein said creation unit creates part of an IP header and part of a MAC header in a TCP layer using the transmission destination IP address and the next transmission destination MAC address managed by the connection management information stored in said connection management table.

8. A control method for a communication apparatus which communicates with a terminal, which has a transmission destination IP address, as a packet transmission destination via a network, and includes a routing table configured to hold a next transmission destination IP address as route information, an ARP table configured to manage an IP address and a MAC address of the terminal on the network in association with each other, and a connection management table configured to hold connection management information as information added to each connection in TCP communication, the method comprising:
   deciding a next transmission destination IP address by referring to the routing table in connection establishment processing in TCP communication;
   deciding a next transmission destination MAC address associated with the next transmission destination IP address by referring to the ARP table;
   storing the transmission destination IP address and the next transmission destination MAC address as the connection management information in the connection management table; and
   creating a transmission packet using the transmission destination IP address and the next transmission destination MAC address which are managed by the connection management information stored in the connection management table.

9. A non-transitory computer-readable storage medium storing a program for causing a computer to control a communication apparatus which communicates with a terminal, which has a transmission destination IP address, as a packet transmission destination via a network, and includes a routing table configured to hold a next transmission destination IP address as route information, an ARP table configured to manage an IP address and a MAC address of the terminal on the network in association with each other, and a connection management table configured to hold connection management information as information added to each connection in TCP communication, the program causing the computer to function as
   a route decision unit configured to decide a next transmission destination IP address by referring to the routing table in connection establishment processing in TCP communication,
   a MAC address decision unit configured to decide a next transmission destination MAC address associated with the next transmission destination IP address by referring to the ARP table,
   a storage unit configured to store the transmission destination IP address and the next transmission destination MAC address as the connection management information in the connection management table, and
   a creation unit configured to create a transmission packet using the transmission destination IP address and the next transmission destination MAC address which are managed by the connection management information stored in the connection management table.

* * * * *